(12) United States Patent
Li

(10) Patent No.: US 7,170,744 B2
(45) Date of Patent: Jan. 30, 2007

(54) COMPUTER COMPONENT MOUNTING APPARATUS

(75) Inventor: Tsung-Hsi Li, Tu-cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 84 days.

(21) Appl. No.: 11/020,079

(22) Filed: Dec. 21, 2004

(65) Prior Publication Data

US 2005/0237712 A1    Oct. 27, 2005

(30) Foreign Application Priority Data

Apr. 27, 2004   (CN) .................... 2004 2 0045479

(51) Int. Cl.
*G06F 1/16* (2006.01)
*H05K 7/20* (2006.01)

(52) U.S. Cl. .................. 361/687; 361/732; 454/187; 165/298

(58) Field of Classification Search ............... 454/184, 454/187; 361/679–687, 724–727, 732, 740; 165/122; 312/298
See application file for complete search history.

(56) References Cited

U.S. PATENT DOCUMENTS 6,244,953 B1 * 6/2001 Dugan et al. .............. 454/184
6,722,971 B2 * 4/2004 Gough ...................... 454/187
7,002,796 B2 * 2/2006 Lao et al. .................. 361/695
2006/0003683 A1 * 1/2006 Chen ......................... 454/184

FOREIGN PATENT DOCUMENTS

| CN | 01201836.8 | 1/2002 |
|---|---|---|
| TW | 88217278 | 9/2001 |

* cited by examiner

*Primary Examiner*—Hung Van Duong
(74) *Attorney, Agent, or Firm*—Morris Manning & Martin LLP; Tim Tingkang Xia, Esq.

(57) ABSTRACT

A computer component mounting apparatus includes a bracket assembly (200) secured in a computer chassis (10), and a top panel (30) attached to the bracket assembly. The bracket assembly includes a first bracket for receiving fans (50) therein. The first bracket includes a pair of side panels (21), and a number of spaced beams (25) connecting top extremities of the side panels. A pair of retaining tabs (26) depends from opposite side edges of each beam. A number of supporting tabs (24) are formed from inner surface of the side panels in the bottom. The fans are disposed in the first bracket, held by the supporting tabs and the retaining tabs. The top panel is covered on the top of the bracket assembly by fasteners to hold fans in the computer chassis.

18 Claims, 4 Drawing Sheets

COMPUTER COMPONENT MOUNTING APPARATUS

BACKGROUND OF THE INVENTION

1. Field of the Invention

The present invention relates to computer mounting apparatus, and particularly to a computer component mounting apparatus which can readily secure at least one fan in to a computer chassis.

2. Related Art

Modern high-speed central processing units (CPUs) generate copious amounts of heat which needs to be efficiently dissipated. A typical contemporary personal computer incorporating a CPU often includes one or more fans to cool the CPU.

However, a single fan does not always effectively dissipate large amounts of heated air generated from modern powerful CPUs. Accordingly, a second fan is often installed at an outside panel of a computer enclosure, to bring cooling air into the enclosure. The second fan is generally attached to the enclosure with screws. This conventionally requires a tool. The attachment procedure is unduly tedious and inconvenient, especially when the enclosure is small. Furthermore, other components in the enclosure are prone to be accidentally damaged during the attachment procedure.

U.S. Pat. No. 6,244,953 discloses a mounting bracket for a single fan. The fan is received in the bracket, and the combined fan and bracket is readily hung on a rear panel of an enclosure. However, the mounting bracket can install only one fan on the rear panel. When several fans need to be installed, several mounting brackets need to be hung one by one. This is unduly costly and laborious.

Thus, an improved mounting apparatus for a fan which solves the above-mentioned problems is strongly desired.

SUMMARY OF THE INVENTION

Accordingly, an object of the present invention is to provide a mounting apparatus which readily and firmly secures at least one fan in a computer chassis.

To achieve the above-mentioned object, a mounting apparatus in accordance with the present invention is for securing at least one fan to in an electronic device. The mounting apparatus comprises a bracket assembly secured in a computer chassis, and a top panel attached to the bracket assembly. The bracket assembly includes a first bracket for receiving fans therein. The first bracket includes a pair of side plates, and a plurality of spaced beams connecting top extremities of the side plates. A pair of retaining tabs depends from opposite side edges of each beam. A plurality of supporting tabs is formed from inner surface of the side plate in the bottom. The fans are disposed in the first bracket, held by the supporting tabs and the retaining tabs. The top panel is covered on the top of the bracket assembly by fasteners to hold fans in the computer chassis.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
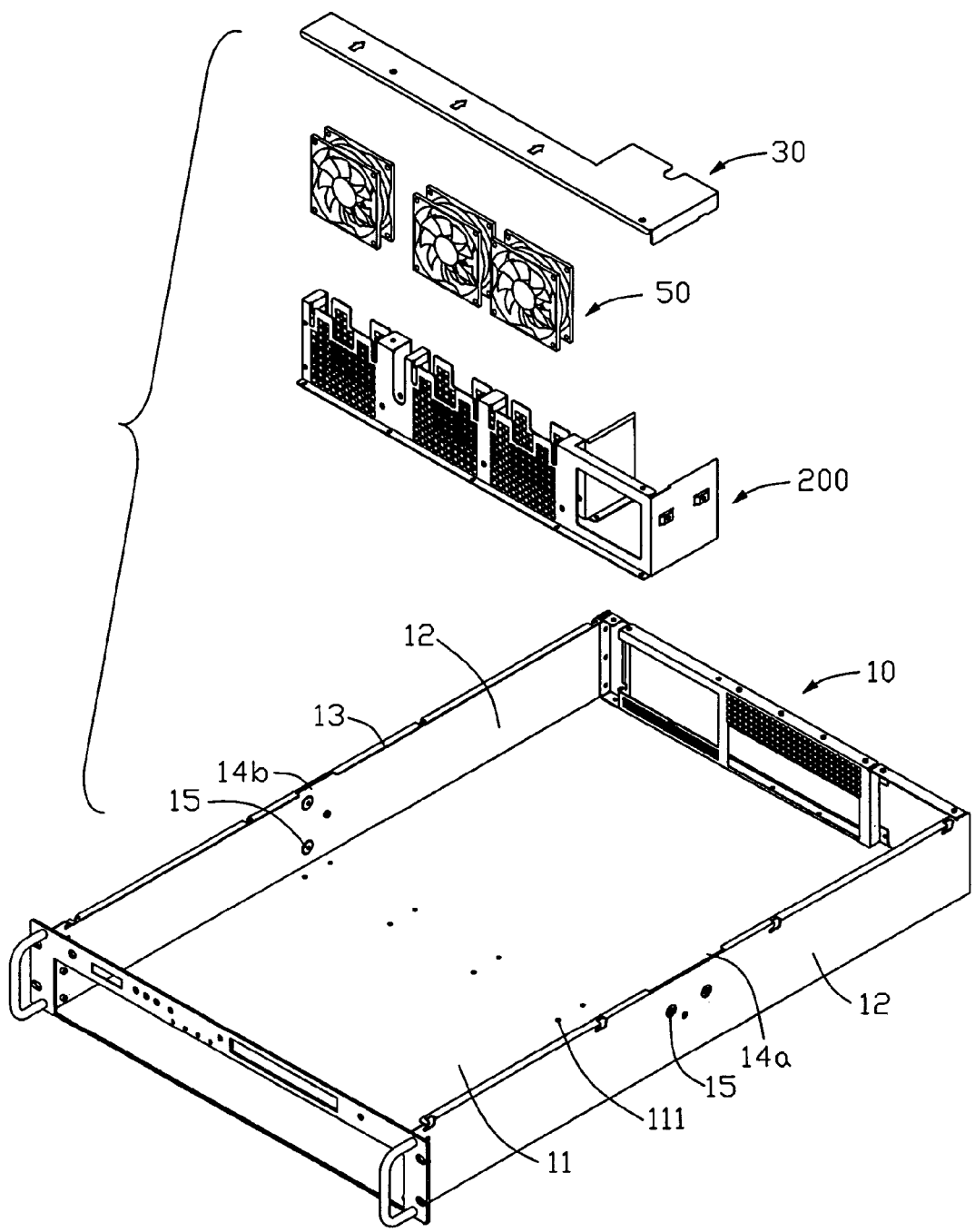
FIG. 1 is an exploded, isometric view of a mounting apparatus of the present invention, together with a plurality of fans.

Referring to FIG. 1, a mounting apparatus of the present invention is used to secure fans 50 in a computer chassis 10. The mounting apparatus comprises a bracket assembly 200, a top panel 30 attached to the bracket assembly 200.

The computer chassis 10 comprises a bottom panel 11, and a pair of side panels 12 extending upwardly at opposite edges of the bottom panel 11. A plurality of fixing holes 111 is defined in the bottom panel 11. A pair of flanges 13 extends perpendicularly and inwardly from top edges of the side panels 12, toward each other. A cutout 14a, 14b is respectively defined in the flanges 13. A plurality of screw holes 15 is respectively defined in the side panels 12, corresponding the cutouts 14a, 14b.

Figure 2:
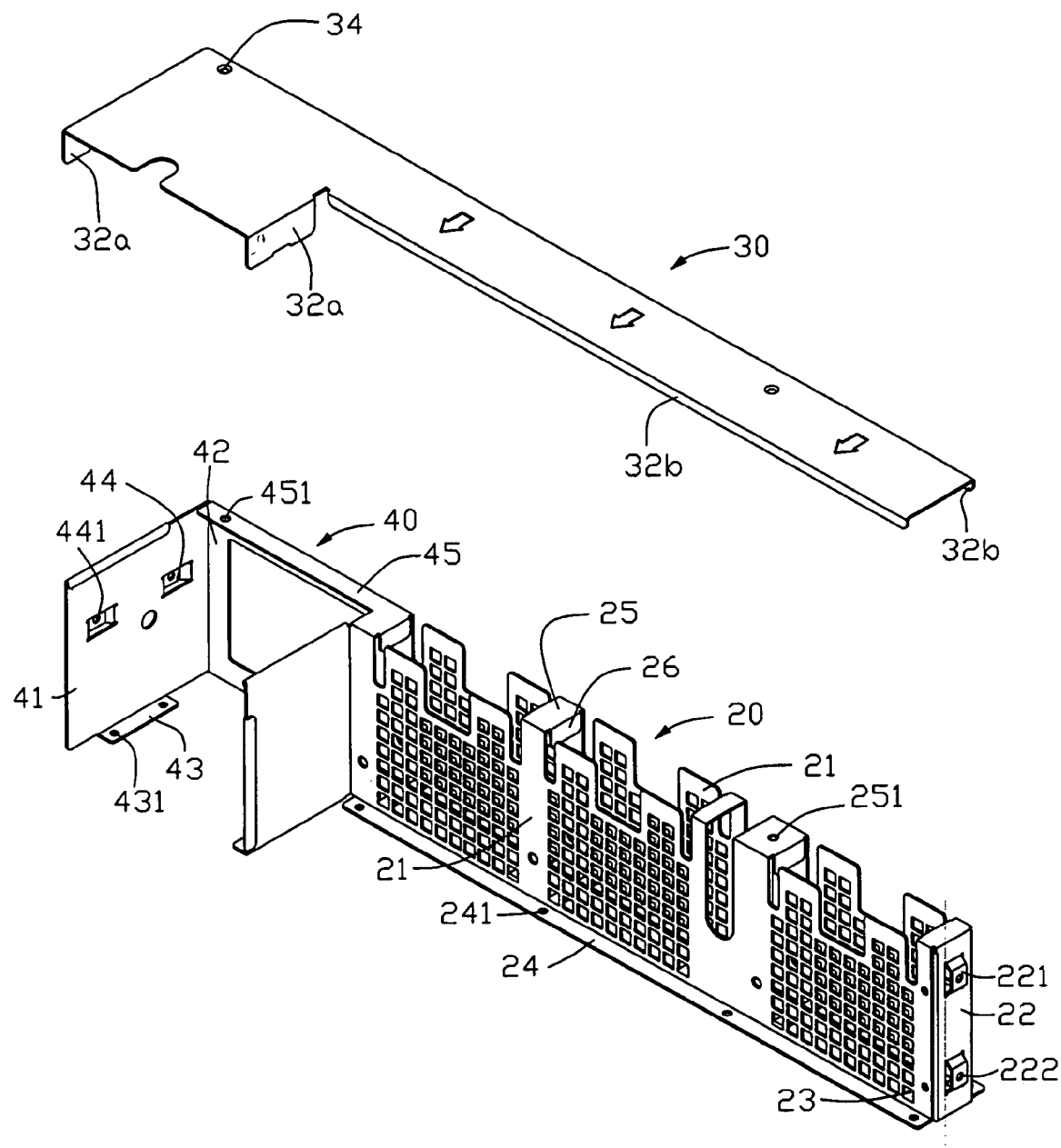
FIG. 2 is an enlarged, isometric view of a bracket assembly, and a top panel of FIG. 1, but viewed from another aspect.
Figure 3:
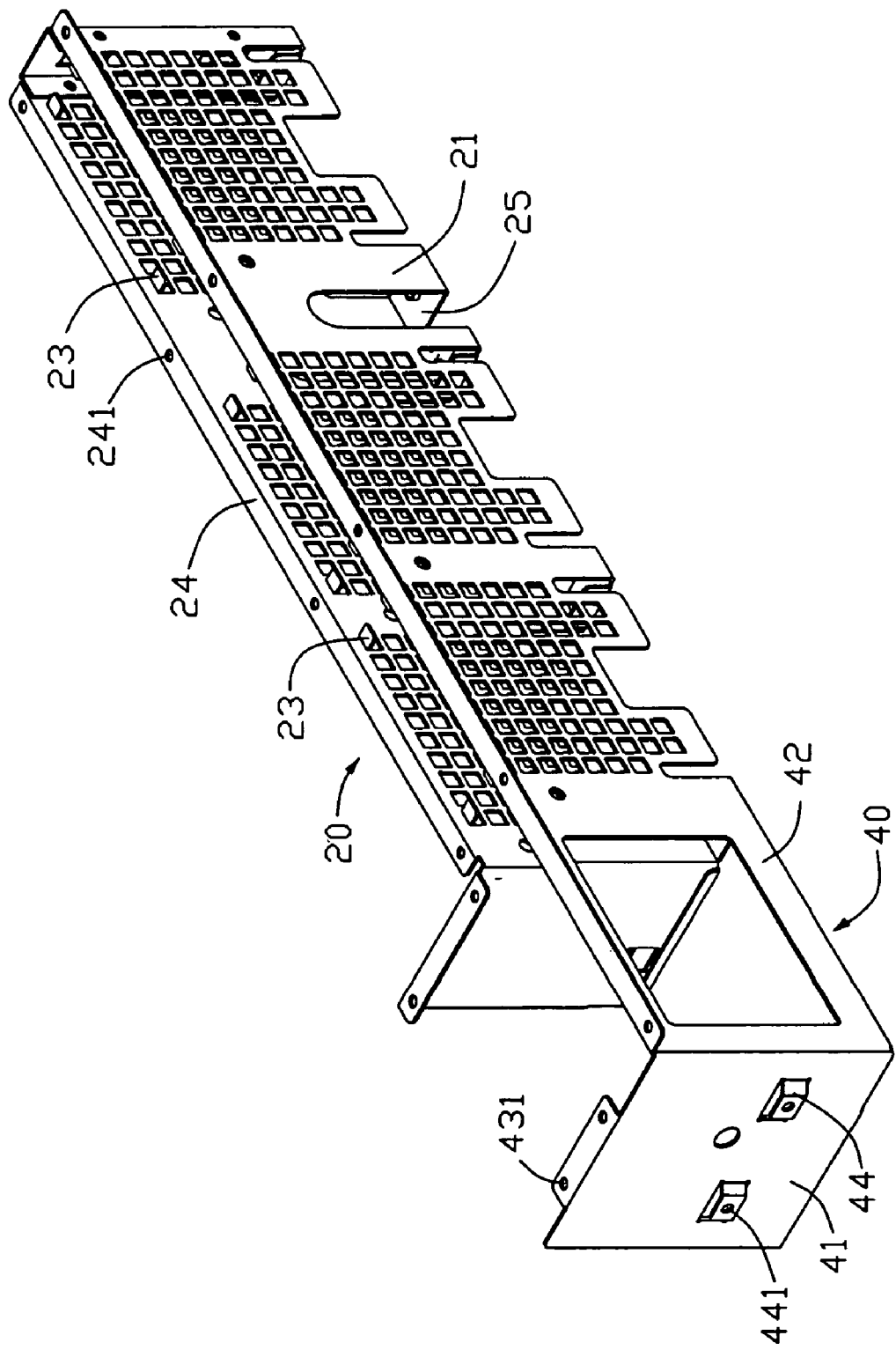
FIG. 3 is an enlarged, isometric view of the bracket assembly of FIG. 1, but showing the bracket inverted from FIG. 1.

Referring also to FIG. 2, the bracket assembly 200 comprises a first bracket 20, and a second bracket 40 extending from an outer end of the first bracket 20. The first bracket 20 is for holding fans 50 therein and the second bracket 40 is for holding other components therein, such as SPS (not shown). The first bracket 20 comprises a pair of parallel side plates 21 defining a plurality of air ventilating apertures (not labeled), and an end plate 22 forming at an inner end thereof. Referring to FIG. 3, a plurality of supporting tabs 23 extends perpendicular from inner surfaces of the side plates 21 in the bottom. A plurality of spaced beams 25 connects top extremities of the side plates 21, cooperatively defining a plurality of separating fans receiving spaces. A pair of resiliently retaining tabs 26 depends obliquely from opposite side edges of each beam 25. A securing hole 251 is defined in one of the beams 25. A pair of outward flanges 24 extends outwardly perpendicularly from bottom edges of the side plates 21. A plurality of second fixing holes 241 is defined in the outward flanges 24, corresponding to the fixing holes 111 of the computer chassis 10. A pair of first protrusions 221 each defining a first through hole 222 extends outwardly from the end plate 22.

The second bracket 40 comprises a pair of sidewalls 41 perpendicular to the side plates 21 of the first bracket 20, and a rear wall 42 perpendicular to the sidewalls 41, cooperatively defining a receiving space. A pair of second protrusions 44 each defining a second through hole 441 extends outwardly from an outer sidewall 41. A pair of inward flanges 43 extends perpendicularly from bottom edges of the sidewalls 41, toward each other. A plurality of fixing holes 431 is defined in the inward flanges 43. A horizontal flange 45 defining a securing hole 451 extends inwardly from a top edge of the rear wall 42.

The top panel 30 has an L-shaped configuration. A plurality of vertical flanges 32a, 32b depends from some peripheral edges thereof, corresponding to side panels 21 of the first bracket 20 and sidewalls 41 of the second bracket 40. A plurality of through apertures 34 is defined in the top panel 30, corresponding to the securing hole 451 of the second bracket 40 and the securing hole 251 of the first bracket 20.

Figure 4:
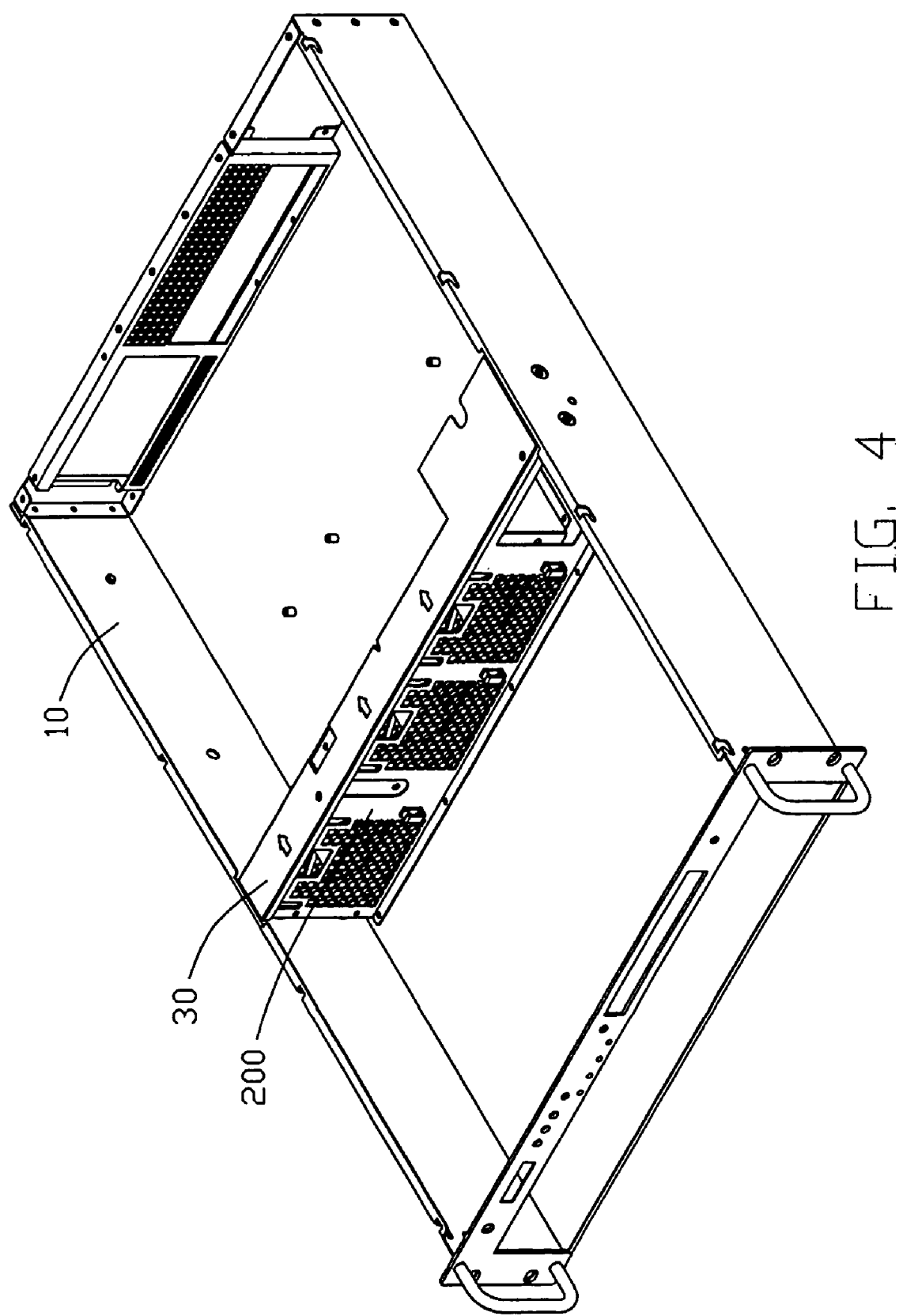
FIG. 4 is an assembled view of FIG. 1.

Referring also to FIG. 4, in assembly, the bracket assembly 200 is attached in the computer chassis 10 along the cutouts 14a, 14b. Some fasteners (not shown) are extended through the fixing holes 241, 431 of the bracket assembly 200 and engage in the fixing holes 111 of the computer chassis 10. Other fasteners (not shown) are extended through the through holes 221, 451 of the bracket assembly 200 and engage in the fastening holes 15 of the side panels 12 of the computer chassis 10. Then the fans 50 are disposed in corresponding fan receiving spaces of the first bracket 20 of the bracket assembly 200, held on the supporting tabs 23 and retained between the retaining tabs 26. The top panel 30 is covered on the top of the bracket assembly 200, with the flanges 32a, 32b abutting the side plates 21 and the sidewalls 41 of the bracket assembly 200. Screws (not shown) are extended through the through apertures 34 of the top panel 30 and engage in the securing holes 251, 451 of the bracket assembly 200 for securing the fans 50 in the computer chassis 10.

In disassembly, the screws are unscrewed and disengages from the top panel 30 and the fans 50 are readily taken out of the bracket assembly 200.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

I claim:

1. A mounting apparatus for securing fans in a computer chassis comprising:
    a first bracket being adapted to be secured in the computer chassis, the first bracket comprising a pair of side panels arranged parallel to each other defining a continuous channel therebetween, and a plurality of spaced beams connecting top portions of the side panels, cooperatively defining a plurality of fan receiving spaces in the channel to respectively receive corresponding fans therein, a retaining tab depending from sides of each beam for retaining the corresponding fans in the spaces, respectively, and a plurality of supporting tabs extending from a bottom of the side panels for supporting the fans thereon; and
    a top panel attached on the first bracket to enclose the channel together with the pair of side panels.

2. The mounting apparatus as described in claim 1, wherein the side panels define a plurality of air flowing ventilating apertures.

3. The computer component mounting apparatus as described in claim 1, wherein a plurality of flanges depends from the top panel, corresponding to the side panels of the first bracket.

4. The computer component mounting apparatus as described in claim 1, wherein a through aperture is defined in the top panel, and a securing hole is correspondingly defined in one of the beams.

5. The computer component mounting apparatus as described in claim 1, wherein a pair of flanges extends perpendicularly from bottom edges of the side panels, a plurality of fixing holes is defined in the flanges.

6. The computer component mounting apparatus as described in claim 1, wherein the first bracket comprises an end panel at one end thereof, and a second bracket at the other end thereof.

7. A mounting apparatus comprising:
    a computer chassis comprising a bottom panel, and a pair of side panels, a plurality of fixing holes defined in the bottom panel, and a plurality of fastening holes defined in the side panels;
    a bracket assembly secured in the computer chassis, the bracket assembly comprising a first bracket for holding at least one fan, and a second bracket extending integrally from the first bracket for holding a computer component other than said at least one fan, the first bracket comprising a pair of side plates arranged parallel to each other, and a plurality of spaced beams disposed between the side plates, cooperatively defining a plurality of fan receiving spaces between the pair of side plates, a plurality of retaining tabs formed from the beams and supporting tabs formed form the side plates for retaining the at least one fan in the plurality of fan receiving spaces, respectively;
    a top panel covering on the top of the bracket assembly, at least one through aperture defined in the top panel; and
    at least one fastener extended through said through aperture of the top panel and engaging with one beam of the bracket assembly.

8. The mounting apparatus as described In claim 7, wherein a pair of flanges extending perpendicularly inwardly from top edges of the side panels of the chassis, a cutout is defined in each flange.

9. The computer component mounting apparatus as described in claim 8, wherein a pair of outward flanges extends perpendicularly from the side plate of the first bracket, a plurality of fixing holes is defined in the flanges, corresponding to the fixing holes of the bottom panel.

10. The computer component mounting apparatus as described in claim 9, wherein the first bracket further comprises an end plate formed at one end thereof, a plurality of through holes is defined in the end plate, corresponding to the fastening holes of the side panel of the chassis.

11. The computer component mounting apparatus as described in claim 10, wherein the second bracket is formed at another end of the first bracket the second bracket comprises a pair of sidewalls, and a rear wall.

12. The computer component mounting apparatus as described in claim 11, a pair of inward flange extends perpendicularly from bottom edges of the sidewalls, a plurality of fixing holes is defined in the flanges.

13. The computer component mounting apparatus as described in claim 12, a plurality of protrusions extends outwardly from an outer sidewall of the second bracket, a through hole is defined in each protrusion.

14. A mounting apparatus for securing fans in a computer chassis comprising:
    a bracket adapted to be secured to a bottom panel of the computer chassis, the bracket being integrally formed, the bracket comprising two parallel arranged side panels defining a continuous channel therebetween and adapted for clamping the fans therebetween, a plurality of beams bridging top edges of the side panels, and a plurality of retaining tabs adapted for abutting against a side surface of a corresponding fan without entirely separating the channel.

15. The mounting apparatus as described in claim 14, wherein a top panel is attached to the beams.

16. The mounting apparatus as described in claim 14, wherein the retaining tabs depend from each of the beams.

17. The mounting apparatus as described in claim 14, wherein each of the side panels defines a plurality of ventilation apertures.

18. The mounting apparatus as described in claim 14, wherein a plurality of supporting tabs is stamped inwardly from each of the side panels for supporting the fans.

* * * * *